(12) United States Patent
Ciobotaru

(10) Patent No.: US 11,605,473 B1
(45) Date of Patent: Mar. 14, 2023

(54) MATERIAL FOR REDUCING EXPOSURE TO IONIZING RADIATION

(71) Applicant: Iron Knight Aviation, LLC, Jacksonville, FL (US)

(72) Inventor: Flo Ciobotaru, Hudson (CA)

(73) Assignee: Iron Knight Aviation, LLC, Jacksonville, FL (US)

( * ) Notice: Subject to any disclaimer, the term of this patent is extended or adjusted under 35 U.S.C. 154(b) by 4 days.

(21) Appl. No.: 17/073,948

(22) Filed: Oct. 19, 2020

Related U.S. Application Data

(60) Provisional application No. 62/916,388, filed on Oct. 17, 2019.

(51) Int. Cl.
*G21F 1/02* (2006.01)
*B32B 5/18* (2006.01)
(Continued)

(52) U.S. Cl.
CPC ............... *G21F 1/02* (2013.01); *A41D 13/00* (2013.01); *A42B 3/04* (2013.01); *B32B 5/022* (2013.01); *B32B 5/18* (2013.01); *B32B 5/245* (2013.01); *B32B 7/025* (2019.01); *B32B 7/027* (2019.01); *B32B 7/12* (2013.01); *B32B 15/08* (2013.01); *B32B 15/14* (2013.01); *B32B 15/20* (2013.01); *A41D 2500/30* (2013.01); *A41D 2500/52* (2013.01); *B32B 2250/05* (2013.01);
(Continued)

(58) Field of Classification Search
CPC .. G21F 1/02; A41D 13/00; A42B 3/04; B32B 5/18; B32B 5/022; B32B 5/245; B32B 15/20
See application file for complete search history.

(56) References Cited

U.S. PATENT DOCUMENTS 7,196,023 B2   3/2007   Langley et al.
7,476,889 B2   1/2009   Demeo et al.
(Continued)

FOREIGN PATENT DOCUMENTS

KR   20180012507 A   2/2018
WO   2015199276 A1   12/2015

OTHER PUBLICATIONS

"Radiation Protective Textiles for Earth and Beyond"; by IFA (https://advancedtextilessource.com/author/webteam); Apr. 7, 2014.

*Primary Examiner* — Hai Vo
(74) *Attorney, Agent, or Firm* — GrayRobinson, P.A.; Michael J. Colitz, III

(57) ABSTRACT

A material for reducing exposure to ionizing radiation. One exemplary embodiment comprises a felt layer; a foil layer; a first adhesive film layer disposed between the outer felt layer and the foil layer; a radiation shield layer; a second adhesive film layer disposed between the foil layer and radiation shield layer; and a foam layer disposed on the surface of the radiation shield layer opposite the second adhesive film layer. The material may be installed in commercial aircraft, corporate aircraft, flight suits, helmets, military uniforms, rotary aircraft, spacecraft, and the like. For example, the material disclosed herein may be provided as a headliner in an aircraft, or alternatively may be used to line the entire interior of an aircraft. In one or more embodiments, the material may be secured to a surface using a hook and loop attachment mechanism.

10 Claims, 4 Drawing Sheets

(51) Int. Cl.
  *B32B 5/24*   (2006.01)
  *B32B 7/12*   (2006.01)
  *B32B 7/025*  (2019.01)
  *B32B 7/027*  (2019.01)
  *B32B 15/14*  (2006.01)
  *B32B 15/20*  (2006.01)
  *B32B 15/08*  (2006.01)
  *A41D 13/00*  (2006.01)
  *A42B 3/04*   (2006.01)
  *B32B 5/02*   (2006.01)

(52) U.S. Cl.
  CPC . *B32B 2264/107* (2013.01); *B32B 2264/1022* (2020.08); *B32B 2264/1023* (2020.08); *B32B 2307/212* (2013.01); *B32B 2437/00* (2013.01); *B32B 2605/18* (2013.01)

(56) References Cited

U.S. PATENT DOCUMENTS

| | | |
|---|---|---|
| 7,518,137 B2 | 4/2009 | Okamura et al. |
| 10,276,273 B2 | 4/2019 | Milstein et al. |
| 10,319,485 B2 | 6/2019 | Sugita et al. |
| 2004/0119032 A1 | 6/2004 | Chen |
| 2006/0210700 A1* | 9/2006 | Lachner ............ A61L 29/04 427/2.1 |
| 2012/0248346 A1* | 10/2012 | Chowdhary ........ G21F 3/02 428/40.1 |
| 2014/0158918 A1 | 6/2014 | Petroski |
| 2015/0020679 A1* | 1/2015 | Oxford ............ F41H 5/06 89/36.02 |
| 2018/0174696 A9 | 6/2018 | Milstein et al. |
| 2019/0043628 A1 | 2/2019 | Milstein et al. |

* cited by examiner

MATERIAL FOR REDUCING EXPOSURE TO IONIZING RADIATION

CROSS REFERENCE TO RELATED APPLICATION

This application claims priority to, and the benefit of, U.S. Provisional Patent Application Ser. No. 62/916,388, filed Oct. 17, 2019, the entirety of which is incorporated by reference and commonly owned.

BACKGROUND

Cosmic ionizing radiation originates from outer space. A very small amount of this radiation reaches Earth. At airplane flight altitudes, passengers and crew members are exposed to higher levels of cosmic radiation as compared to on the Earth's surface. Cosmic radiation exposures on aircraft include, for example, galactic cosmic radiation and solar particle events, sometimes called "solar flares." Aircraft crew and passengers are exposed to cosmic ionizing radiation on every flight.

Ionizing radiation causes cancer and reproductive problems in humans. The U.S. Centers for Disease Control and Prevention classifies airline crew members as radiation workers. In fact, the National Council on Radiation Protection and Measurements reported that aircrews have, on average, the highest yearly dose of radiation out of all radiation-exposed workers in the US.

Most studies on the effects of ionizing radiation have examined people bombarded with high amounts of various kinds of radiation, such as atomic bomb survivors and those who received radiation therapy. For this reason, it is currently unknown what level of cosmic radiation is safe for humans. Thus, there are no official limits on the amount of radiation an airplane crew member can receive each year.

The annual exposure of aircrews to ionizing radiation is an estimated at about 3 millisieverts (mSv) per person, which exceeds the annual doses received by other high-radiation jobs, such as X-ray technicians and nuclear power workers. Only astronauts are more exposed to ionizing radiation—10 days in space delivers about 4.3 mSv to the skin alone, which is equivalent to about 4.3 years of cosmic radiation on Earth's surface.

There is a need in the art for materials capable of reducing exposure to radiation during aircraft flight or other scenarios wherein a person faces a rick of radiation exposure. The embodiments disclosed herein are aimed at fulfilling these and other needs in the art.

SUMMARY

One or more embodiments of the present disclosure comprise a material for reducing exposure to ionizing radiation. One exemplary embodiment comprises a felt layer; a foil layer; a first adhesive film layer disposed between the outer felt layer and the foil layer; a radiation shield layer; a second adhesive film layer disposed between the foil layer and radiation shield layer; and a foam layer disposed on the surface of the radiation shield layer opposite the second adhesive film layer. The material may be installed in commercial aircraft, corporate aircraft, flight suits, helmets, military uniforms, rotary aircraft, spacecraft, and the like. For example, the material disclosed herein may be provided as a headliner in an aircraft, or alternatively may be used to line the entire interior of an aircraft. In one or more embodiments, the material may be secured using a hook and loop attachment mechanism.

Alternatively, one or more embodiments may comprise a radiation shield layer coated in a composition comprising at least one of lycopene, selenium, glutathione peroxidase, progesterone, B6, vitamin C (l-ascorbic acid, ASC), vitamin E (d-alpha-tocopherol), zinc, and/or any combination thereof. The composition may be applied to the radiation shield layer by any suitable means, including but not limited to brushing or spraying the composition onto the material.

BRIEF DESCRIPTION OF THE DRAWINGS

The following detailed description of exemplary embodiments will be better understood when read in conjunction with the appended drawings. For the purpose of illustrating the embodiments, there are shown in the drawings embodiments which are presently preferred. It should be understood, however, that the preferred embodiments are not limited to the precise arrangements and instrumentalities of the embodiments shown in the drawings.

DETAILED DESCRIPTION OF EXEMPLARY EMBODIMENTS

Figure 1A:
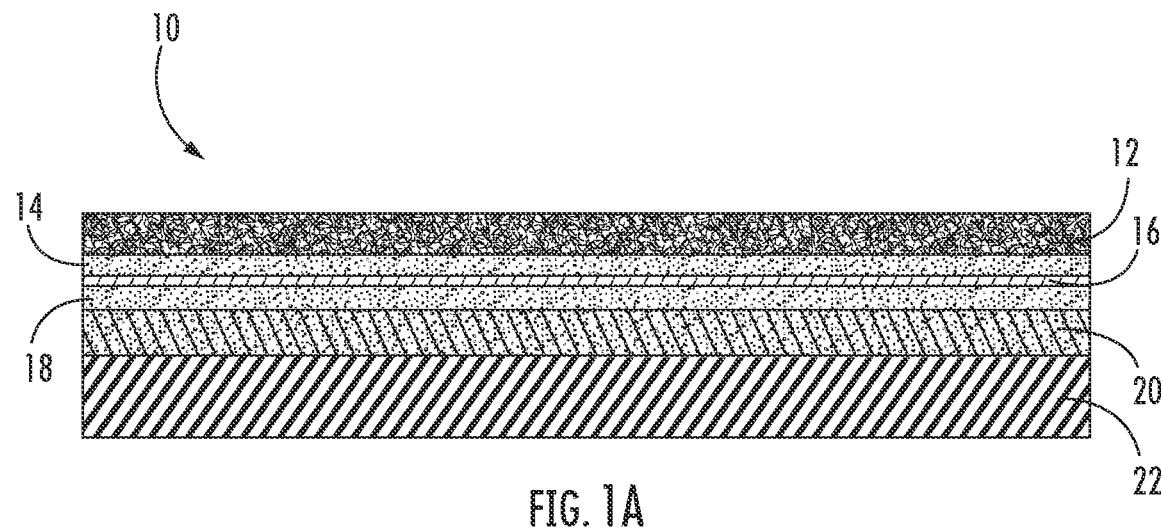
FIG. 1A depicts a plan view of an exemplary embodiment of the present disclosure.

The figures, images, and descriptions of the disclosed embodiments have been simplified to illustrate elements that are relevant for a clear understanding, while eliminating, for the purposes of clarity, many other elements which may be found in one or more embodiments. Those of ordinary skill in the pertinent art will recognize that other elements are desirable and/or required in order to implement the present embodiments. However, because such elements are well known in the art, and because such elements do not facilitate a better understanding of the present embodiments, a discussion of such elements is not provided herein.

Reference throughout this specification to "one embodiment" or "an embodiment" or the like means that a particular feature, structure, or characteristic described in connection with the embodiment is included in at least one embodiment. Thus, appearances of the phrases "in one embodiment" or "in an embodiment" or "one or more embodiments" or the like in various places throughout this specification are not necessarily all referring to the same embodiment.

In addition, for the purpose of promoting an understanding of the principles of the present disclosure, reference will now be made to the embodiments shown and described herein, and specific language will be used to describe the same. It will, nevertheless, be understood that no limitation of the scope of the disclosure is thereby intended; any alterations and further modifications of the described or illustrated embodiments and any further applications of the principles of the disclosure as illustrated herein are contemplated as would normally occur to one skilled in the art to which the disclosure relates. All limitations of scope should be determined in accordance with and as expressed in the eventual claims of one or more issued patents. Unless defined otherwise, all technical and scientific terms used herein have the same meaning as commonly understood by one of ordinary skill in the art to which the inventive subject matter of this disclosure belongs. Although any methods and materials similar or equivalent to those described herein can be used in the practice or testing of the present embodiments, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

Ranges: throughout this disclosure, various aspects of the embodiments can be presented in a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6, and so on. This applies regardless of the breadth of the range.

Reference will now be made in detail to several embodiments, examples of which are also illustrated in the accompanying drawings, photographs, and/or illustrations.

Figure 1B:
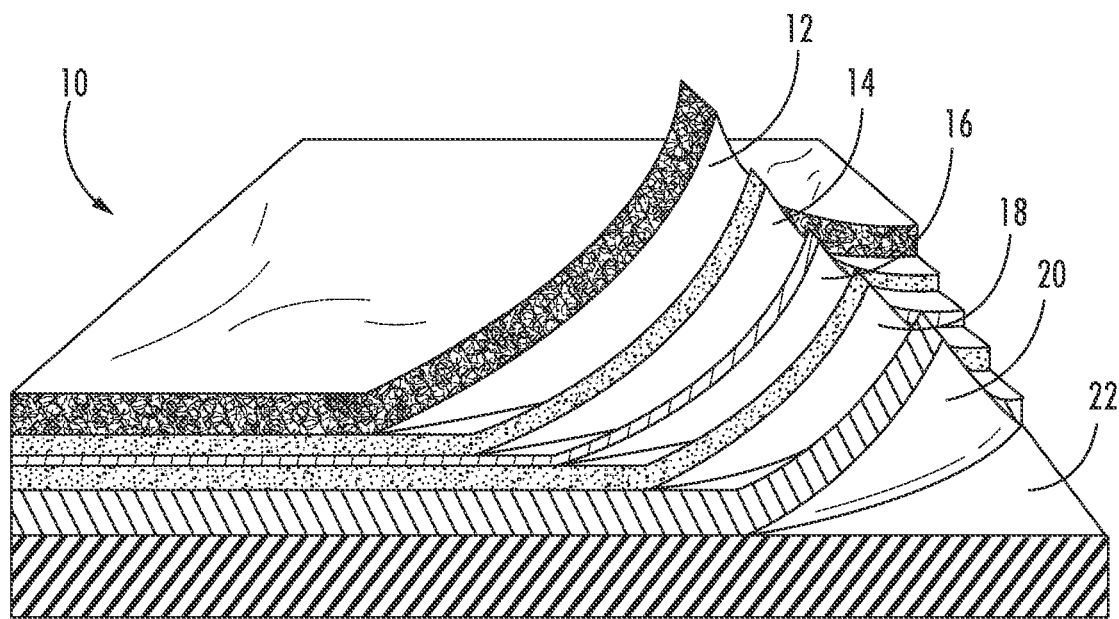
FIG. 1B depicts a perspective view of the exemplary embodiment of FIG. 1.

As depicted in FIGS. 1A and 1B, one or more embodiments of the present disclosure provide a multilayer material 10 for reducing the passage of, and/or a person's exposure to, ionizing radiation, the material comprising a felt layer 12; a foil layer 16; a first adhesive film layer 14 disposed between the felt layer 12 and the foil layer 16; a radiation shield layer 20; a second adhesive film layer 18 disposed between the foil layer 16 and radiation shield layer 20; a foam layer 22 disposed on the surface of the radiation shield layer 20 opposite the second adhesive film layer 18, and any combination thereof. The material may be used in any situation wherein a reduction in exposure to ionizing radiation is desired, such as, for example, as a headliner of an aircraft or to line a helmet and/or a flight suit.

The above exemplary embodiment is a dual-purpose product for reducing a passage of at least one of sound waves and radiation. In the event that only the radiation protection is required or desired, the felt layer 12, first adhesive film layer 14, the foil layer 16, second adhesive film layer 18 and foam layer 22 may be excluded from the material. In lieu of these elements, the core material may be wrapped with a felt-like material.

Figure 2:
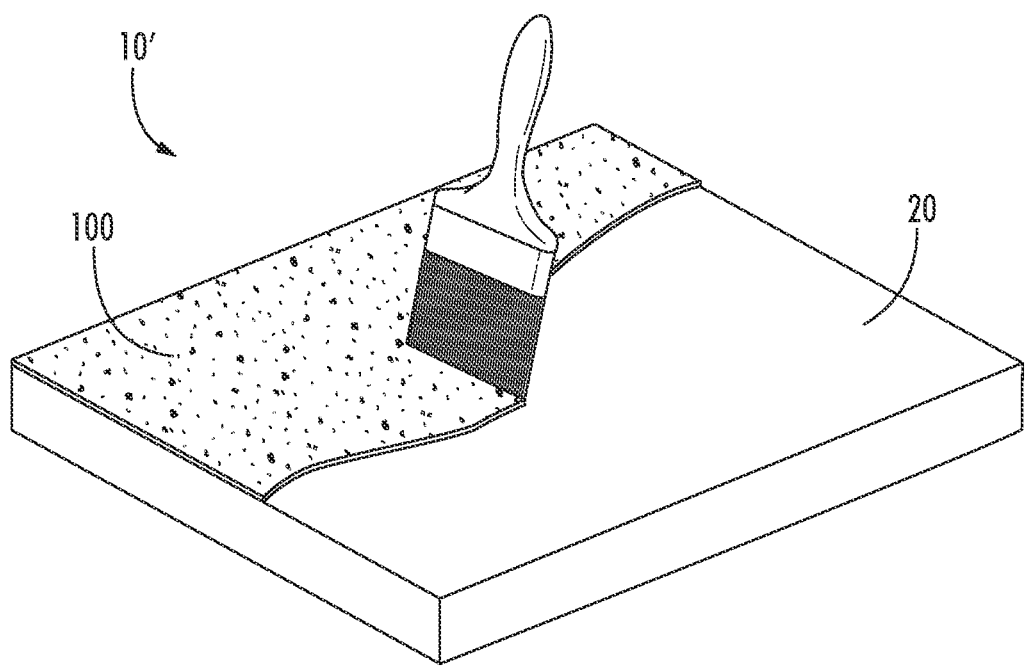
FIG. 2 depicts an alternative exemplary embodiment of the present disclosure.
Figure 3:
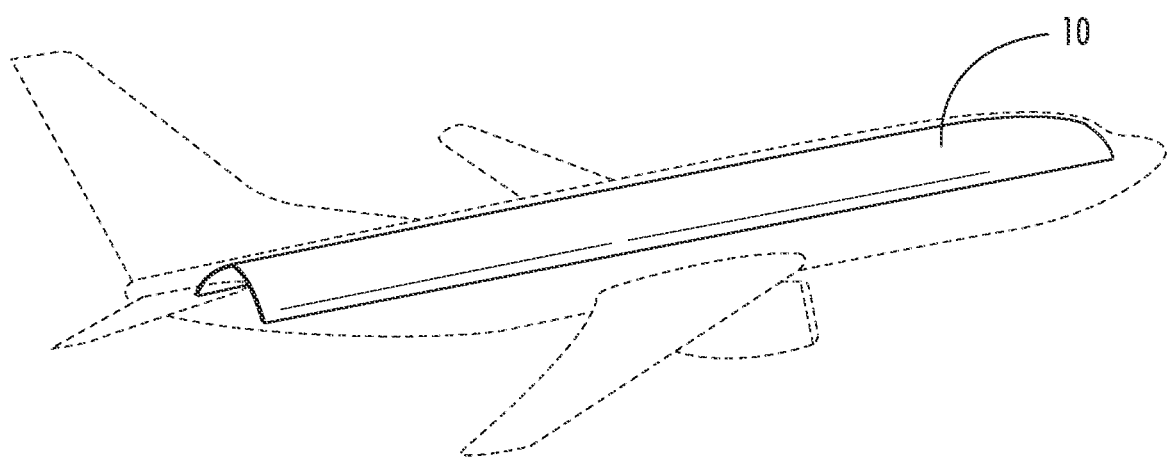
FIG. 3 depicts an exemplary use of an embodiment of the present disclosure.

Alternatively, and as depicted in FIG. 2, one or more embodiments of the present disclosure may comprise the core radiation shield layer 20 coated in a composition 100 comprising at least one of lycopene, selenium, glutathione peroxidase, progesterone, B6, vitamin C (l-ascorbic acid, ASC), vitamin E (d-alpha-tocopherol), zinc, and/or any combination thereof. A method of producing one or more embodiments of the present disclosure may therefore comprise providing or procuring the radiation shield layer 20, applying a composition 100 comprising at least one of lycopene, selenium, glutathione peroxidase, progesterone, B6, vitamin C (l-ascorbic acid, ASC), vitamin E (d-alpha-tocopherol), zinc, and/or any combination thereof to the radiation shield layer, and allowing said composition to dry. Alternatively, one or more embodiments may comprise applying to a surface a composition comprising at least one of lycopene, selenium, glutathione peroxidase, progesterone, B6, vitamin C (l-ascorbic acid, ASC), vitamin E (d-alpha-tocopherol), zinc, and/or any combination thereof.

In one or more embodiments, said applying comprises brushing. Other methods for applying the composition 100 to the radiation shield layer are considered to be within the scope of the present disclosure. For example, the composition 100 may be sprayed onto the radiation shield layer 20, or provided as part of a film that is adhered to the radiation shield layer 20. In one or more embodiments, the composition is allowed to air dry on the surface of the material. Alternatively, the composition may be heated or cooled to facilitate drying.

Figure 4:
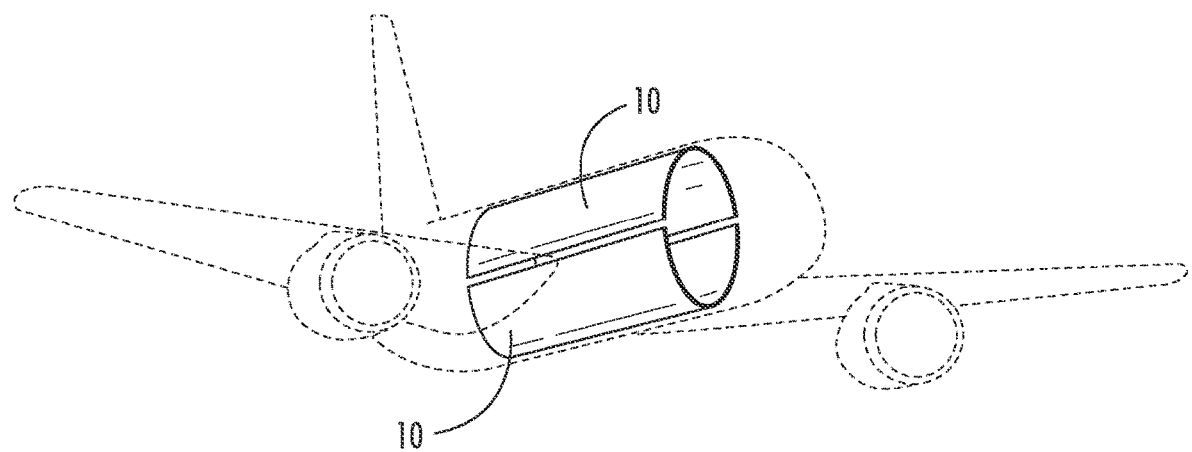
FIG. 4 depicts an exemplary use of an embodiment of the present disclosure.

FIGS. 3-6 depict exemplary uses of one or more embodiments of the present disclosure. For example, FIG. 3 discloses one or more embodiments deployed as an aircraft headliner, wherein the material is installed in or adjacent to an upper portion of the aircraft so as to limit a person's exposure to ionizing radiation emanating from above. Alternatively, as depicted in FIG. 4, the material may be installed around the entire circumference of an aircraft's fuselage so as to limit exposure to ionizing radiation emanating from any direction.

Figure 5:
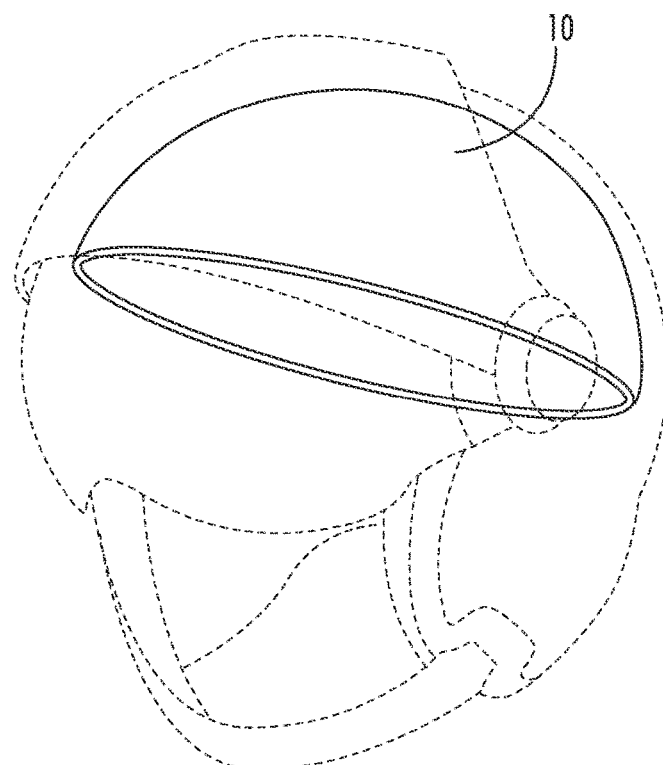
FIG. 5 depicts an exemplary use of an embodiment of the present disclosure.
Figure 6:
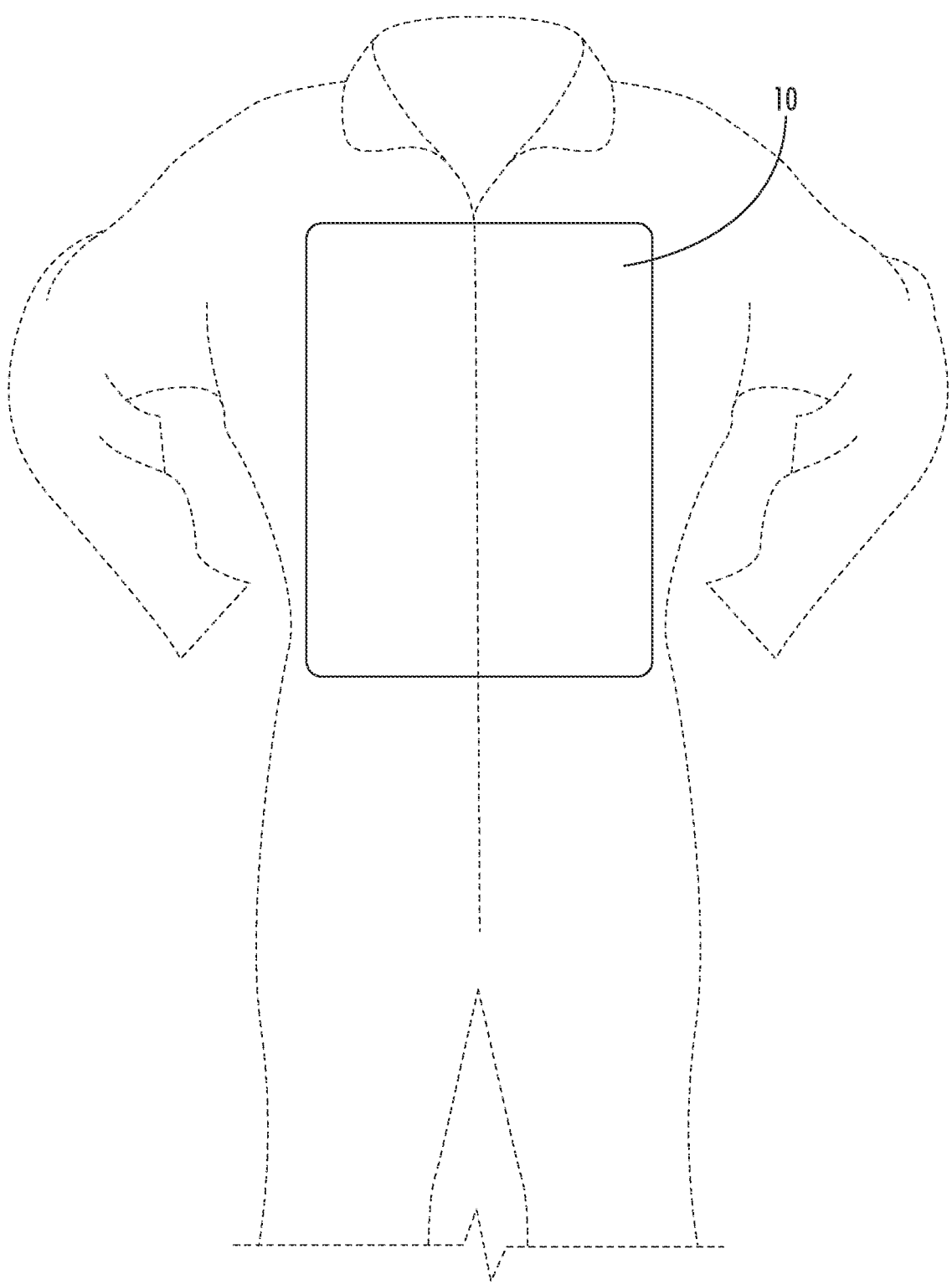
FIG. 6 depicts an exemplary use of an embodiment of the present disclosure.

FIG. 5 depicts an embodiment wherein the material is installed in a helmet, such as a flight helmet or astronaut's helmet. This serves to protect the wearer's head and brain from exposure to ionizing radiation. Likewise, FIG. 6 depicts an embodiment wherein the material is incorporated into a wearable material, such as a flight suit, space suit, or other suit worn by a person or animal.

In one or more embodiments, the radiation shield layer 20 may comprise a radiopaque polymeric material, an example of which is described in U.S. Pat. No. 7,476,889, the entirety of which is incorporated by reference. By way of non-limiting example, the radiation shield layer may comprise a flexible layer formed from a radiopaque polymeric mixture having a polymer and a radiopaque nano-material. The nano-material may be selected from the group consisting of nanoparticles, nanotubes and nano-platelets. In one or more embodiments, the nano-material may be formed from one or more nano-sized substances selected from the group of tungsten, barium, boron, tantalum, bismuth, silver, gold, platinum, aluminum, copper, depleted uranium, cerium oxide ($CeO_2$), yttrium oxide ($Y_2O_3$), lanthanum oxide ($La_2O_3$) and neodymium oxide ($Nd_2O_3$). In one or more embodiments, the nano-material may be formed from one or more radiopaque substances including nano-sized lead or tin. In one or more embodiments, the nano-material includes transitional-metal dichalcogenides. In one or more embodiments, the nano-material is selected from the group consisting of nano-spheres, nano-hemispheres and nano-parabolas. In one or more embodiments, said nano-material is selected from the group consisting of natural nano-clays, synthetic nano-clays, layered silicic acids and nanotubes.

In one or more embodiments, the polymer is selected from the group consisting of polyurethane, polyamide, polyvinyl chloride, polyvinyl alcohol, natural latex, polyethylene, polypropylene, ethylene vinyl acetate, polyester, acrylonitrile-butadiene-styrene, acrylic, polyisoprene, polystyrene, polysulfone polycarbonate, polyoxymethylene, acetal, polytetrafluoroethylene, ionomers, celluloses, polyetherketone, silicones, epoxy, elastomers and polymer foams. The polymeric mixture may further comprise a fire retardant nanomaterial.

In one or more embodiments, the fire retardant nanomaterial is selected from the group consisting of nano-clays, nano sized antimony oxide, nano-sized antimony pentoxite, and nano-sized compounds of molybdenum, titanium, zirconium, zinc, silicon carbide, silicon nitrate, aluminum nitride, alumina trihydrate, magnesium hydroxide, organic brominated compounds, organic chlorinated compounds, natural and synthetic nano-clays, pyrophyllite, chlorites, smectites, montmorillonites, palygorskites, talc, vermiculite, sauconite, saponite, nontronite and mica.

The radiopaque polymeric material may comprise an additive within said polymeric mixture to impart enhanced chemical, biological or projectile protection, such as, for example, alumina oxides, aironia oxides, ferrite oxides, titanate oxides, mixed complex oxides, carbide powders, nitride powders and boride powders.

In one or more embodiments, the radiation protective nano-material is selected from the group of nano-sized lead, tin, tungsten, barium, boron, tantalum, bismuth, silver, gold, platinum, aluminum, copper, depleted uranium, barium, cerium oxide ($CeO_2$), yttrium oxide ($Y_2O_3$), lanthanum oxide ($La_2O_3$) and neodymium oxide ($Nd_2O_3$).

In one or more embodiments, said polymer is selected from the group consisting of polyurethane, polyamide, polyvinyl chloride, polyvinyl alcohol, natural latex, polyethylene, polypropylene, ethylene vinyl acetate, polyisoprene, polystyrene, polysulfone, polyester, acrylonitrile-butadiene-styrene, acrylic, polycarbonate, polyoxymethylene, acetal, polytetrafluoroethylene, ionomers, celluloses, polyetherketone, silicones, epoxy, elastomers and polymer foams.

In one or more embodiments, said material comprises an additional radiation protective material selected from the group consisting of lead, tin, barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Copyhold, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium lodomethamate, Sozoiodolic Acid, Thorium Oxide and Trypanoate Sodium.

Other suitable radio-opaque may be utilized in connection with the various embodiments without departing from the spirit and scope of the present disclosure.

In one or more embodiments, the felt layer 12 may comprise the commercially-available Nomex MC8-4592B. In one or more embodiments, the felt layer 12 comprises a heat and flame resistant treatment or fiber, such as damping material. One exemplary damping material includes a pressure sensitive adhesive that is compliant with the material flammability requirements of 14 C.F.R. § 25.853(a). In one or more embodiments, the damping material may have a base weight of about 9.5 ounces per sq. yard, a thickness of about 0.125 inches, a thermal range of about −55 degrees F. to about 450 degrees F., and a thermal conductivity wherein K=0.24 BTU/in/hr/degree F./sq. foot. Other suitable materials may be used without departing from the scope of the present disclosure. For example, plain felt material may be utilized in connection with one or more embodiments.

In one or more embodiments, the foil layer 16 comprises an aluminum foil, such as the commercially-available FT 0840 provided by Buckley Industries, Inc. The foil layer 16 provides an additional benefit of reducing the transmission of sound into the aircraft. Other exemplary foil layers may comprise a damping material minus foam.

In one or more embodiments, at least one of said first and second adhesive layers comprise a bonding agent, such as, for example the commercially-available adhesive film FT 1935 provided by Buckley Industries, Inc. Alternative adhesive layers may comprise a 3M epoxy glue or the like. Any suitable adhesive layer(s) may be used, however, without departing from the spirit and scope of the present disclosure.

In one or more embodiments, said foam layer comprises a damping composite material, such as, for example, the commercially-available foam Bu 700 provided by Buckley Industries, Inc. Alternative foam layers may comprise damping materials as described herein.

This disclosure has been presented for purposes of illustration and description but is not intended to be exhausting or limiting. Many modifications and variations will be apparent to those of ordinary skill in the art having the benefit of the present disclosure. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those particular descriptions, and that various other changes and modifications may be devised therein by one skilled in the art without departing for the scope or spirit of the disclosure. The appended claims are intended to be construed to include all such embodiments and equivalent variations.

What is claimed is:

1. A multilayer material for reducing the passage of radiation, the multilayer material comprising:
    a felt layer comprising flame resistant fibers;
    an aluminum foil layer;
    a first adhesive film layer disposed between the felt layer and the aluminum foil layer;
    a radiation shield layer comprising a blend of a polymer and a radiopaque nano-material;
    a second adhesive film layer disposed between the aluminum foil layer and the radiation shield layer;
    a polymeric foam layer comprising a damping composite material and disposed on the surface of the radiation shield layer opposite the second adhesive film layer; and
    wherein the layers are substantially parallel to each other.

2. The multilayer material of claim 1, wherein at least one of said first and second adhesive layers comprises an epoxy bonding agent.

3. An aircraft headliner for reducing a person's exposure radiation, the aircraft head liner comprising:
    a first layer comprising a felt layer of flame resistant fibers;

a second layer adjacent the first layer, the second layer comprising a first adhesive film;

a third layer adjacent the second layer, the third layer comprising an aluminum foil layer;

a fourth layer adjacent the third layer, the fourth layer comprising a second adhesive film;

a fifth layer adjacent the fourth layer, the fifth layer comprising a radiation barrier made of a blend of a polymer and a radiopaque nano-material;

a sixth layer adjacent the fifth layer, the sixth layer comprising a polymeric foam layer made of a damping composite material;

and wherein the layers are substantially parallel to each other.

4. The aircraft headliner of claim 3, wherein at least one of the first and second adhesive films comprises a self-adhesive film.

5. The aircraft headliner of claim 3, wherein at least one of the layers further comprises a flame retardant.

6. A wearable article comprising a wearable material and a multilayer material incorporated into the wearable material for reducing exposure to ionizing radiation, the multilayer material comprising:

a felt layer comprising flame resistant fibers;

an aluminum foil layer;

a first adhesive film layer disposed between the felt layer and the aluminum foil layer;

a radiation shield layer comprising a polymer and a radiopaque nano-material;

a second adhesive film layer disposed between the aluminum foil layer and radiation shield layer;

a polymeric foam layer comprising a damping composite material and disposed on the surface of the radiation shield layer opposite the second adhesive film layer; and wherein the layers are substantially parallel to each other.

7. The wearable article of claim 6, wherein the wearable material is a helmet.

8. The wearable article of claim 6, wherein the wearable material is a flight suit.

9. The wearable article of claim 6, wherein the multilayer material forms an outer surface of the wearable article.

10. The wearable article of claim 6, wherein the wearable material comprises at least two portions and wherein the multilayer material is disposed between the at least two portions of the wearable material.

\* \* \* \* \*